Figure 2:
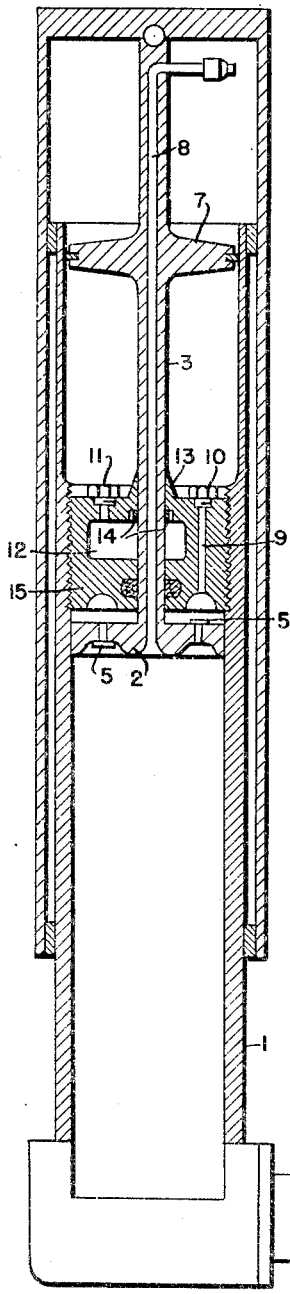

Sept. 1, 1953

RENE LUCIEN LEVY
ALSO KNOWN AS
RENE LUCIEN
LIQUID SPRING SHOCK-ABSORBER
Filed May 26, 1948

2,650,820

INVENTOR
Rene Lucien Levy
Also known as Rene Lucien
BY Hascock Downing & Seebass
ATTORNEYS Patented Sept. 1, 1953

2,650,820

UNITED STATES PATENT OFFICE 2,650,820

LIQUID SPRING SHOCK-ABSORBER

René Lucien Levy, also known as René Lucien, Paris, France, assignor to Societe d'Inventions Aeronautiques et Mecaniques S. I. A. M., Geneva, Switzerland, a corporation of Switzerland Application May 26, 1948, Serial No. 29,249
In France June 6, 1947

3 Claims. (Cl. 267—64)

There exist various types of shock absorbers called "liquid spring" shock absorbers. The most common type, which is illustrated diagrammatically in Figure 1 of the accompanying drawings, is constituted by a cylinder 1, inside which there is movably arranged a piston 2, the rod 3 of which penetrates into the cylinder through a fluid-tight packing 4. During the braking action produced by the valves 5 of the piston 2, the compression of the oil due to the penetration of the rod 3 produces pressures which are of the order of 3,000 to 4,000 kgs. per sq. cm. Consequently, the cylinder 1 must be thick and therefore heavy.

The present invention consists essentially in the use of such a shock absorber, the cylinder of which is necessarily heavy, as a constituent element of that part of a landing gear which, by reason of the forces to which it must be subjected, must necessarily be heavy in itself, namely the rod of an overhanging shock absorber.

Figure 1:
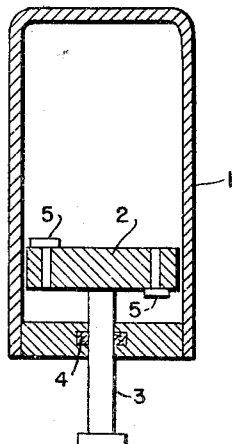
Figure 3:
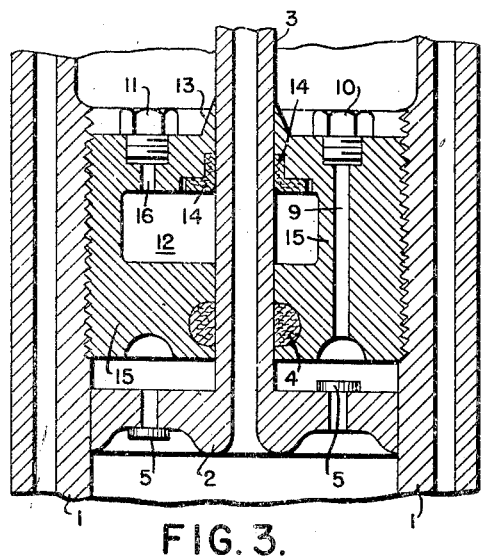

Further and more specific objects will be apparent from the accompanying drawings, in which:

Figure 1 illustrates diagrammatically and in longitudinal section a known type shock absorber, Figure 2 is a longitudinal sectional view illustrating the improvement in accordance with the invention, and Figure 3 is an enlarged sectional fragmentary view illustrating in more detail the structure of the closure means within the cylinder.

According to one essential feature, the cylinder 1 of the shock absorber constitutes in itself the sliding rod mounted in overhanging fashion on the shaft 6.

The packing 4 and the support thereof, which constitute the end 15 of the cylinder of the shock absorber are located at such a height that the distribution of the thicknesses of the cylinder over its height correspond to the figures calculated for the construction of the rod of the landing gear in overhanging fashion. In the event of the length of the rod 3 being too great, buckling thereof will be prevented by providing the said rod at a suitable height with a guide diaphragm 7.

Since the shock absorber is thus inverted, it is necessary to provide special arrangements to ensure filling of the shock absorber and lubrication of the packings thereof.

The piston rod 3 comprises for this purpose a filling channel 8, drainage being effected through the aperture provided with the valve 5 and through the channel 9, which can be opened at 10. A further channel 16, closed by a plug 11, is provided for filling with liquid the cavity 12 serving for the lubrication and protection of the principal packing 4.

At 13 is indicated a protecting scraper, and 14 denotes a packing provided to prevent leakage of the liquid under pressure contained in cavity 12 should the shock absorber be turned over during retraction.

The piston rod 3 is removably attached at its upper end to the cylindrical member surrounding the tubular rod constituting the cylinder 1 of the shock-absorber. This cylindrical member is of course fixed with relation to the aircraft so that the tubular rod that supports the shaft or axle 6 moves in relation thereto. The guide diaphragm 7 is provided with suitable apertures, not shown, through which access may be had to the plugs 10 and 11 which respectively close the passages 9 and 16.

In disassembling the arrangement illustrated, the piston rod 3 is detached from the adjacent base of the cylinder member housing the cylinder 1 and then the cylinder 1 together with the piston rod 3 are removed. In this fashion the various filling plugs controlling the channel 8 and the channels 9 and 16 can be opened for insertion of the fluid.

It is thus clear that from the structural standpoint this present invention provides a shock absorber for a landing gear of aircraft of the overhanging type. Of course each wheel of the aircraft is as usual provided with a shock absorber and in this present arrangement the shock absorber consists of a cylinder 1 that contains liquid that is directly connected to and extends at right angles with respect to the axle or wheel support 6. Therefore the cylinder constitutes a compression chamber that receives liquid, the elasticity of which upon compression supplies resilient resistance. The cylinder has a wall thickness that is sufficient to confine the liquid under high pressure and is also sufficient to resist bending under impact shocks occasioned upon landing of the aircraft. A piston 2 is provided within the cylinder and movable therein. A rod 3 extending from the piston projects beyond the upper end of the cylinder and is removably fixed at its upper end with relation to the aircraft. Thus the piston constitutes a liquid compression member partitioning the cylinder 1 and operable upon movement to vary the volume thereof. The cylinder 1 is internally threaded to receive the packing support or block 15 which constitutes closure means within the cylinder that delimit the upper effective length thereof. This support 15 of course has opposite faces with a draining channel 9 extending therebetween. A closure plug 10 is provided for this drainage channel. A central aperture is provided through the packing support so that the piston rod 3 passes therethrough. Interiorly of this support 15 is an enlarged lubricating cavity 12 and the piston rod 3 passes therethrough. This lubricating cavity is filled through the filling channel 16 which is closed by the closure plug 11 applied to the top face of the packing support. The fluid type packing is provided at 14 between the piston rod and the closure. Therefore and as shown in the drawings, the piston is inwardly of the closure means that define the end of the cylinder.

I claim:

1. A shock-absorber for landing gear of aircraft of the type in which each wheel includes an axle, including a cylinder for containing liquid directly connected to and extending at right angles with respect to the axis of the axle, said cylinder constituting a compression chamber receiving liquid, the elasticity of which upon compression supplies resilient resistance, said cylinder having a wall thickness sufficient to confine the liquid under high pressure and sufficient to resist bending under impact shocks occasioned upon landing of the aircraft, a piston within the cylinder and movable therein, a rod extending from the piston projecting beyond the upper end of the cylinder and removably fixed at its upper end with relation to the aircraft, said piston constituting a liquid compression member partitioning the cylinder and operable upon movement to vary the volume thereof, means providing an apertured insert movably arranged within the cylinder in fixed relation thereto with respect to the axial extent thereof constituting a closure at one end of the cylinder, said piston being inwardly of the closure and the piston rod passing therethrough, said closure having a drainage channel between the opposite faces thereof and a closure plug for said channel on the face of the closure opposite to the piston.

2. A shock-absorber for landing gear of aircraft as defined in and by claim 1 in which said closure is provided with a lubricating cavity within the body thereof through which the piston rod passes, the closure further having a filling channel providing communication between the lubricating cavity and the face thereof opposite to that adjacent the piston and a closure plug for said channel.

3. A shock-absorber for landing gear of aircraft of the type in which each wheel includes an axle, including a cylinder for containing liquid directly connected to and extending at right angles with respect to the axis of the axle, said cylinder constituting a compression chamber receiving liquid, the elasticity of which upon compression supplies resilient resistance, said cylinder having a wall thickness sufficient to confine the liquid under high pressure and sufficient to resist bending under impact shocks occasioned upon landing of the aircraft, a piston within the cylinder and movable therein, a rod extending from the piston projecting beyond the upper end of the cylinder and removably fixed at its upper end with relation to the aircraft, said piston constituting a liquid compression member partitioning the cylinder and operable upon movement to vary the volume thereof, closure means within the cylinder delimiting the upper effective length of the cylinder and including opposite faces, said closure means having a drainage channel extending between the opposite faces thereof, a closure plug for said channel, said closure means further being apertured and said piston rod passing therethrough, said closure means having a lubricating cavity within the same and through which said rod passes, a filling channel between said cavity and the upper face of said closure means, a closure plug for said filling channel on the upper face of said closure means and a fluid type packing between the piston rod and the closure means and located in that area of the closure means between the upper face thereof and the upper extremity of the cavity.

RENÉ LUCIEN LEVY,
*Also known as René Lucien.*

References Cited in the file of this patent

UNITED STATES PATENTS

| Number | Name | Date |
|---|---|---|
| 1,928,061 | Laddon | Sept. 26, 1933 |
| 2,191,359 | Thornhill | Feb. 20, 1940 |
| 2,346,667 | Dowty | Apr. 18, 1944 |
| 2,376,678 | Foster | May 22, 1945 |

FOREIGN PATENTS

| Number | Country | Date |
|---|---|---|
| 660,045 | France | July 5, 1929 |
| 665,399 | France | May 6, 1929 |

OTHER REFERENCES

Autocar Magazine (pages 234–235), June 23, 1944.